US011619574B2

(12) United States Patent
Vanmeerbeeck et al.

(10) Patent No.: US 11,619,574 B2
(45) Date of Patent: Apr. 4, 2023

(54) DEVICE FOR DETECTING PARTICLES IN AIR

(71) Applicant: IMEC VZW, Leuven (BE)

(72) Inventors: Geert Vanmeerbeeck, Keerbergen (BE); Ziduo Lin, Heverlee (BE); Abdulkadir Yurt, Heverlee (BE); Richard Stahl, Rotselaar (BE)

(73) Assignee: IMEC VZW, Leuven (BE)

( * ) Notice: Subject to any disclaimer, the term of this patent is extended or adjusted under 35 U.S.C. 154(b) by 4 days.

(21) Appl. No.: 17/127,800

(22) Filed: Dec. 18, 2020

(65) Prior Publication Data

US 2021/0190663 A1 Jun. 24, 2021

(30) Foreign Application Priority Data

Dec. 20, 2019 (EP) ..................................... 19218689

(51) Int. Cl.
*G01N 15/06* (2006.01)
*G01N 15/02* (2006.01)
*G03H 1/08* (2006.01)

(52) U.S. Cl.
CPC ..... *G01N 15/0656* (2013.01); *G01N 15/0211* (2013.01); *G01N 15/0227* (2013.01);
(Continued)

(58) Field of Classification Search
CPC ........... G01N 15/0656; G01N 15/0211; G01N 15/0227; G01N 15/0606;
(Continued)

(56) References Cited

U.S. PATENT DOCUMENTS

| 6,923,848 B2 | 8/2005 | Totoki |
| 8,167,986 B2 | 5/2012 | Schneider et al. |

(Continued)

FOREIGN PATENT DOCUMENTS

| EP | 2869059 A1 * | 5/2015 | ............... A46B 3/02 |
| EP | 3260840 A1 * | 12/2017 | ......... G01N 15/0227 |

(Continued)

OTHER PUBLICATIONS

Sharma et al., "High vol. electrostatic field-sampler for collection of fine particle bulk samples, Atmospheric Environment", vol. 41, Issue 2, pp. 369-381, https://doi org/10.1016/j.atmoseny.2006.07.034. Jan. 2007.

(Continued)

*Primary Examiner* — Roy M Punnoose
(74) *Attorney, Agent, or Firm* — Moser Taboada (57) ABSTRACT

The inventive concept relates to a device for detecting particles in air, said device comprising a receiver for receiving a flow of air comprising particles, a sample carrier, and a particle capturing arrangement. The particle capturing arrangement is configured to separate the particles from the flow of air for and to collect a set of particles on a surface of the sample carrier. The device further comprises a light source configured to illuminate the particles on the sample carrier, such that an interference pattern is formed by interference between light being scattered by the particles and non-scattered light from the light source. The device further comprises an image sensor configured to detect the interference pattern. The device further comprises a cleaner configured for cleaning the surface of the sample carrier for enabling re-use of the surface for collection of a subsequent set of particles.

14 Claims, 4 Drawing Sheets

(52) U.S. Cl.
CPC ....... *G01N 15/0606* (2013.01); *G03H 1/0866*
(2013.01); *G01N 2015/0233* (2013.01); *G03H*
*2001/0883* (2013.01)

(58) Field of Classification Search
CPC ....... G01N 2015/0233; G01N 15/0637; G01N
2001/2223; G01N 2015/0046; G01N
15/0612; G01N 35/1004; G01N
2015/1454; G03H 1/0866; G03H
2001/0883
USPC .......................................................... 356/336
See application file for complete search history.

(56) References Cited

U.S. PATENT DOCUMENTS

| | | | |
|---|---|---|---|
| 8,372,183 | B2 | 2/2013 | Doucette et al. |
| 9,250,162 | B2 | 2/2016 | Braden et al. |
| 10,830,687 | B2* | 11/2020 | Hamalainen ....... G01N 15/1436 |
| 2005/0247868 | A1 | 11/2005 | Call et al. |
| 2009/0139399 | A1 | 6/2009 | Kang et al. |
| 2017/0031318 | A1* | 2/2017 | Stahl .................. G01N 15/1429 |
| 2018/0284003 | A1 | 10/2018 | Lucas et al. |
| 2019/0039076 | A1 | 2/2019 | Mainelis et al. |
| 2019/0250559 | A1* | 8/2019 | Hamalainen ........... G01N 21/85 |
| 2021/0190660 | A1* | 6/2021 | Stahl ...................... G06V 20/69 |
| 2021/0190670 | A1* | 6/2021 | Lin .......................... G01N 1/22 |
| 2021/0190671 | A1* | 6/2021 | Vanmeerbeeck ...... G01N 15/06 |

FOREIGN PATENT DOCUMENTS

| | | |
|---|---|---|
| WO | WO-2012/150672 A1 | 11/2012 |
| WO | WO-2018/118934 A1 | 6/2018 |
| WO | WO-2018/165590 A1 | 9/2018 |

OTHER PUBLICATIONS

Doucette et al., "Collection and Detection of Airborne Microorganisms by Combining Electrostatic Precipitation With IR Spectroscopy," in IEEE Sensors Journal, vol. 10, No. 3, pp. 720-727, doi: 10.1109/JSEN.2009.2038570. Mar. 2010.

Kiselev et al., "A flash-lamp based device for fluorescence detection and identification of individual pollen grains", Review of Scientific Instruments 84, 033302; https://doi.org/10.1063/1.4793792, 2013.

Park et al., "Fast Monitoring of Indoor Bioaerosol Concentrations with ATP Bioluminescence Assay Using an Electrostatic Rod-Type SampleR". PLoS One 10(5): e0125251. https://doi.org/10.1371/journal.pone.0125251. May 7, 2015.

Crouzy et al., "All-optical automatic pollen identification: Towards an operational system", Atmospheric Environment, vol. 140, pp. 202-212, https:///doi.org/10.1016/j.atmoseny.2016.05.062. Sep. 2016.

Takikawa et al., "An Electrostatic-Barrier-Forming Window that Captures Airborne Pollen Grains to Prevent Pollinosis". Int. J. Environ. Res. Public Health, 14, 82. Jan. 2017.

Han et al., "Performance of personal electrostatic bioaerosol sampler (PEBS) when collecting airborne microorganisms", Journal of Aerosol Science, vol. 124, 2018, pp. 54-67, https://doi.org/10.1016/j.jaerosci.2018.07.004. Oct. 2018.

Reiprich et al., "Localized collection of airborne biological hazards for environmental monitoring", Sensors and Actuators B: Chemical, vol. 273, pp. 906-915, https://doi.org/10 1016/j snb.2018 06 129. Nov. 10, 2018.

Extended European Search Report for Application No. EP 19218689. 8, dated May 28, 2020.

Xiquan Cui, et al., "Lensless high-resolution on-chip optofluidic microscopes for Caenorhabditis elegans and cell imaging"; PNAS; Aug. 5, 2008; vol. 105; No. 31; pp. 10670-10675.

\* cited by examiner

DEVICE FOR DETECTING PARTICLES IN AIR

CROSS-REFERENCE TO RELATED APPLICATION

The present application claims priority based on European Application No. 19218689.8, filed on Dec. 20, 2019, which is incorporated herein by reference.

TECHNICAL FIELD

The present inventive concept generally relates to detection of particles in air, and in particular to a device for detecting pollen in air.

BACKGROUND

Interior and exterior air quality is of increasing interest globally. In some instances, monitoring exterior air quality of pollens or dust, or other pollutants is of great interest. Interior air quality, including the presence of molds, fungi, pollen, dust, or living organisms, such as bacteria, is also of growing interest. For example, allergic reactions to air-born pollen is an increasing problem. Therefore, pollen measurements are being carried out and reported, e.g. together with weather reports.

Pollen may be collected using e.g. Hirst samplers or Bertin Coriolis air samplers. Hirst Sampler use an adhesive tape to capture pollen from the air while Bertin Coriolis air samplers transfer pollen to a liquid. In both cases the samples are then manually removed and analyzed, e.g. using standard optical microscopy.

Due to the way the information is obtained, and the manual efforts required to analyze measurements, there is currently a significant delay in acquiring pollen information. Moreover, the number of measurement locations is limited due to the high cost of pollen measurement equipment.

Having technology to drastically increase the amount of compact pollen measurement stations at a low cost but with the ability to execute fully automated measurements at a higher frequency (e.g. several times per day) would have the potential of providing more up-to-date and geographically more precise information on pollen levels in the air. This information would be valuable to people that are affected by pollen allergies, as it could be used on a much more local scale and specific for every individual as an indicator to reduce the consumption of antihistamine and thereby reducing the side-effects of these drugs, such as sedation, drowsiness, and insomnia.

Automated aerosol particle detectors have been developed, as reviewed by Kiselev et al. [Review of Scientific Instruments 84, 033302 (2013)]. Such particle detectors suck in ambient air, including aerosols, and expel the air through a special nozzle. Various light sources are focused at the nozzle outlet. As an aerosol in the flow passes the focal point of the light, it is recognized by the concomitant scattering detected by two photomultiplier tubes equipped with tailored bandpass filters. In addition to light scattering detection, the automated aerosol particle detectors may furthermore detect a fluorescence signal. Although present automated aerosol particle detectors are fully functional, there is still room for improvement.

In terms of monitoring interior air quality with respect to bacteria, for example, the current art requires physical sample collection of a collection device (i.e. Petri dish with a media conducive to bacterial growth) that is placed in an environment and exposed for a given time duration, collected and viewed under a lens (microscope) using standard optical microscopy by a skilled technician, for example.

SUMMARY

In view of the above, an objective of the present inventive concept is to provide a device for detecting particles in air. It is a further objective to facilitate that particles may be determined as particles of interest (e.g. pollen or bacteria) and still allow a high measurement frequency and with a potential of performing automated measurements—including classification or determination of the type of particle collected, yet provided in compact and low-cost solutions. The device is hereinafter primarily described as a device for detecting pollen in air. However, it should be understood that the device may also be used for detecting other types of particles, e.g. mold, fungi, bacteria, dust, dirt, soot, or smoke.

These and other objectives are at least partly met by the invention as defined in the independent claims. Preferred embodiments are set out in the dependent claims.

According to a first aspect of the present inventive concept there is provided a device for detecting particles in air; said device comprising:
a receiver for receiving a flow of air comprising particles;
a sample carrier;
a particle capturing arrangement configured to exert a force on the particles in the flow of air such that the particles are separated from the flow of air for collection of a set of particles on a surface of the sample carrier;
a light source configured to illuminate the particles collected on the surface of the sample carrier, such that an interference pattern is formed by interference between light being scattered by the particles and non-scattered light from the light source;
an image sensor comprising a plurality of photo-sensitive elements configured to detect incident light, the image sensor being configured to detect the interference pattern;
and a cleaner configured for cleaning the surface of the sample carrier for enabling re-use of the surface for collection of a subsequent set of particles.

It should be understood that the "particles" referred to in the present disclosure may be pollen, but may also be any other type of air-borne particulate matter such as soot, air-borne bacteria, or fungi.

By the term "receiver" is here meant any unit, device, or element arranged to allow a flow of air from to pass through it, such that a portion of ambient air may flow into the device. By way of example, a receiver may be, but is not limited to, a funnel or an entrance to a flow channel.

By the term "sample carrier" is here meant any unit or element comprising at least one surface onto which particles from the flow of air may be collected. The sample carrier may be made of either a rigid material or a flexible material. The sample carrier may be extending in a longitudinal direction creating a substantially flat surface onto which particles from the flow of air may be collected. By way of example, the material may be, but is not limited to, glass or plastic. The material may be transparent, partly transparent, opaque, or reflective.

The sample carrier may be further configured for having a smooth top surface and a smooth bottom surface for preventing light from being diffusely scattered by the particle sample carrier.

In the present disclosure, the term "transparent" refers to the physical material property of allowing light to pass through the material without being substantially scattered, either at one or both surfaces of the material or when passing through the material, such that it is possible to see clearly through the material. In some embodiments, the transparency may be substantially uniform over the spectrum of visible light, such that colors viewed through the transparent material are essentially unaltered. Alternatively, the transparency may vary as a function of light wavelength over the visible part of the spectrum, such that the view through the transparent material is tinted in one or more colors.

By the term "particle capturing arrangement" is here meant any arrangement in which the particles experience a force directed towards the sample carrier, and wherein said force will cause the particles to land on the sample carrier.

Given as non-limiting examples, the force may be an active force of the particle capturing arrangement, such as an electrostatic force, magnetic force, or flow force, pushing or pulling the particles towards the sample carrier. Alternatively, the force may be an external force. Given as a non-limiting example, the particle capturing arrangement may cause the flow of air to slow down and become stationary such that a major part of the force exerted onto the particles is a gravitational force, causing the particles to fall down onto the surface of the sample carrier.

It should be understood that the light source may be configured to emit pulsed light. An advantage of using pulsed light may be that motion blur due to object movement during image acquisition may be avoided. Alternatively, the light source may be configured to emit continuous light.

By the term "image sensor" is here meant any light sensor with a plurality of photo-sensitive elements, each configured to detect incident light. Given only as examples, the image sensor may be, but is by no means limited to, a charge-coupled device (CCD) or a complementary metal-oxide-semiconductor (CMOS) image sensor.

It is a realization that forming an interference pattern by interference between light being scattered by the set of particles and non-scattered light, and subsequently detecting said interference pattern with an image sensor, may facilitate several advantages over conventional imaging/microscopy devices. A device according to the inventive concept may e.g. work according to the principles of digital holographic imaging.

It should be understood that the light source and the image sensor may be arranged such that the particles are illuminated, and the interference pattern is detected inside the particle capturing arrangement. Alternatively, the light source and the image sensor may be arranged such that the illumination of particles and the detection of the interference pattern is carried out outside the particle capturing arrangement. In such a case the sample carrier with captured particles needs to be transferred from a particle capturing position in the particle capturing arrangement, to an imaging position.

The non-scattered light from the light source may be passed along a common optical path with the light being scattered by the particles. Thus, the interference pattern may be formed within a wavefront passing the particles and the particle sample carrier in a so-called in-line holography set-up. However, according to an alternative, the non-scattered light may be passed along a separate reference light path, which is combined with the light having been scattered by the particles for reaching the image sensor. In such case, the image sensor may be configured to detect light being reflected by the particles or light being transmitted through the particle sample carrier on which the particles are collected.

By the term "cleaner" is here meant any unit, device or element configured for cleaning the surface of the sample carrier by removing particles collected thereon. Cleaning may be performed after image acquisition of a set of particles on the sample carrier has been completed. By the present arrangement the sample carrier may be reset for re-use to collect a subsequent set of particles. Moreover, cleaning may be performed if an unwanted object has entered the device and landed on the surface of the sample carrier.

An advantage of particle capturing in combination with digital holographic imaging is that it facilitates both fast and more automated data analysis. Further, thanks to the use of holographic imaging, analysis of a particle may be performed to determine, for example through the morphology of the particle, a type of particle that is imaged. This may be used for classifying of particles such that differentiation amongst particles of interest and from other particles is enabled.

Another advantage is that, because of the cleaner configured for cleaning the surface of the sample carrier, the sample carrier can be re-used for a plurality of measurement events. The cleaning of the surface of the sample carrier may allow a maintenance free device to be provided. Further, the cleaning of the surface of the sample carrier may allow for fast reset between measurement events, which may increase the frequency at which measurements are carried out. By the present arrangement a low-cost device for detecting particles in air may be provided, facilitating automated measurement to be made at a higher frequency than presented by solutions available today.

According to a preferred embodiment, the device for detecting particles in air may comprise a transparent sample carrier.

The present arrangement of a transparent sample carrier may allow for in-line holographic imaging to be performed through the sample carrier.

An advantage is that in-line holographic imaging may be realized by a simple set-up. Such a set-up may be preferred as an optical measurement method since it may be robust, which is an advantage for measurement equipment that is intended to be placed outdoors and may therefore be exposed to harsh weather conditions. Further advantages are that such a set-up may be small and realized at low cost.

According to an embodiment, the force exerted on the particles may be an electrostatic force.

The electrostatic force may be an attracting force between the particles and the sample carrier, pulling the particles towards the sample carrier. The electrostatic force may be a repelling force between the particles and a portion of the particle capturing arrangement located on the opposite side of the particles in air with respect to the location of the sample carrier, such that the particles are pushed towards the sample carrier.

According to an embodiment, the particle capturing arrangement may be configured to provide the sample carrier with a first electrical charge.

According to an embodiment, a side of the sample carrier may be provided with a conductive film. The conductive film may be made by any material suitable for making conductive films. By way of example, the conductive film may be, but is not limited to, an Indium Tin Oxide (ITO) film or a Graphene film.

Given as non-limiting examples, the conductive film on the sample carrier may be connected to a circuit which can apply an electrical charge to the conductive film such that the sample carrier may be provided with a first electrical charge. The first electrical charge may by either positive or negative.

According to an embodiment, the particle capturing arrangement may comprise an ionizer system configured to provide the particles in the flow of air with a second electrical charge, wherein the first and second electrical charge may have opposite signs such that the particles are electrostatically attracted to the surface of the sample carrier.

By the term "ionizer system" is here meant a system comprising at least one ionizer. Given as a non-limiting example, the at least one ionizer may be able to provide the particles in the flow of air with a second electrical charge, by providing electrical charge to air molecules in the flow of air, wherein the electrical charge is subsequently transferred from at least a portion of the air molecules to at least a portion of the particles.

An advantage of using electrostatic attraction by electrical charging for capturing particles is that it may be an effective method for capturing particles, which may be easily implemented in practical applications. Further, it may allow for easy control of starting and stopping the capturing of particles, by applying or removing the electrical charges and thus the electrostatic attraction.

According to an embodiment, the particle capturing arrangement may be configured such that, in the particle capturing arrangement, the particles are transferred from the flow of air by a gravitational force.

The particle capturing arrangement may comprise a flow channel with a baffle plate or an increasing cross-section causing the flow of air to slow down and become stationary such that a major part of the force exerted onto the particles is a gravitational force. The sample carrier may be arranged such that it constitutes the lowest plane in the particle capturing arrangement such that the gravitational force may cause the particles to fall down onto the surface of the sample carrier.

Using a gravitational force may be a simple method for transferring particles from the flow of air to the sample carrier.

According to an embodiment, the particle capturing arrangement may comprise a cyclone configured to separate the particles from the flow of air, wherein the particle capturing arrangement may be further configured to allow the separated particles to be transferred such that particles land on the surface of the sample carrier.

A cyclone may effectively and quickly transfer particles from a flow of air to the surface of the sample carrier. A rotating flow of air may be established by a spinner. The spinner may be a structural feature forcing the flow of air to take a rotational path, thereby imposing a rotational motion on the flow of air. For example, the spinner may be a chamber in the form of a cylinder or cone, wherein the flow of air may be expelled tangentially along the inner side wall of the cylinder/cone such that the flow of air is forced to follow the curvature of the inner side wall.

The particles may be separated from the rotating flow of air by centrifugal action. As the flow of air rotates tangentially along the inner side wall of the cylinder or cone the particles may be centrifugally spun towards the inner side wall, hit it, and subsequently fall towards the bottom of the cylinder/cone. At the bottom the particles may be transferred to the surface of the sample carrier.

It should be understood that the spinner may not necessarily be a structural feature. The spinner may also be a fan, a centrifugal blower or a similar device which applies a force to the flow of air, the force imposing a rotational motion.

Once the particles have been transferred to the surface of the sample carrier, the sample carrier may be transferred to the image sensor. The particles may be subsequently be illuminated by the light source, such that an interference pattern is formed by interference between light being scattered by the set of particles and non-scattered light from the light source.

According to an embodiment, the light source may be configured to emit at least partially coherent light.

Coherent light may be advantageous as it improves the interference visibility. A coherent light source may be a laser. However, it should be understood that also partially coherent light may provide an interference pattern with sufficient visibility. A partially coherent light source may e.g. be a light emitting diode emitting light directly onto the flow channel or through a pinhole onto the flow channel. A coherent light source may provide better interference visibility but be more expensive while a partially coherent light source may provide a worse interference visibility but be less expensive.

According to an embodiment:
the light source may be arranged at a first side of the sample carrier; and
the image sensor may be arranged at a second side of the sample carrier, wherein the second side of the sample carrier is opposite to the first side of the sample carrier;
wherein the light source, the sample carrier and the image sensor may be further arranged to provide a light path from the light source to the image sensor through the sample carrier and through the surface of the sample carrier with the collected set of particles.

Such a configuration may be advantageous as it permits in-line holographic imaging. In-line holographic imaging may be particularly useful for imaging samples which are mainly transparent.

An advantage is that in-line holographic imaging may provide a compact measuring setup compared to other holographic imaging measuring setups as the object light, i.e. the light being scattered by the set of particles, and the reference light, i.e. the non-scattered light from the light source, may share a common light path, i.e. the light path through the sample carrier.

It should be understood that the signal to noise ratio, SNR, of the detected interference pattern may decrease with increasing distance between the image sensor and the scattering particle. Thus, it may be advantageous if a distance between the sample carrier and the image sensor is below a distance threshold, wherein the distance is a distance along the light path. The distance threshold may thus define the maximum length of the light path between a particle on the sample carrier and the image sensor. The distance threshold may depend on the acceptable SNR. For example, if the objective is to detect any particle without differentiating between types of particles a lower SNR and a higher distance threshold may be acceptable. If the objective is to differentiate between types of particles, a higher SNR and a lower distance threshold may be necessary. If the objective is to differentiate between very similar particles a yet higher SNR and a yet lower distance threshold may be necessary.

According to an embodiment, the sample carrier and the imaging sensor may be arranged relative to each other such that a distance from the imaging sensor to the particles collected on the sample carrier may be 40 mm or less, 20 mm or less, 10 mm or less, and preferably 5 mm or less. In another embodiment it may be advantageous for the image sensor to be placed at a distance of 2 mm or less from the particles collected on the sample carrier.

An advantage with arranging the imaging sensor at a short distance to the particles on the sample carrier is that the set-up may provide a better holographic imaging quality.

According to an embodiment, the device may be further configured to define a particle concentration relation, defining a relation between the set of particles on the sample carrier and a concentration of particles in the flow of air.

Thus, by the term "particle concentration relation" is here meant the relationship between the number of particles on the sample carrier in the device, and the concentration of particles in the ambient air. The particle concentration relation may be a conversion function that may be applied to the number of particles measured by the device, and thereby translating is to a concentration of particles in the ambient air. The particle concentration relation may be a function dependent on a plurality of parameters. Given as non-limiting examples, such parameters may be air flow velocity though the device, elapsed time for particle collection, cross-sectional area of a flow entrance of the receiver. The particle concentration relation may be calculated from the plurality of parameters. The particle concentration relation may be obtained by a device calibration.

It should be understood that, in order to obtain a statistically reliable value for the concentration of particles in ambient air, a plurality of single measurements may be required. Alternatively, the time spent for particle collection during a single measurement may be increased in order to obtain a statistically reliable value.

The device may have a fixed particle concentration relation which is set when the device is manufactured. The device may also set a particle concentration relation dynamically, e.g. from one measurement to another. For example, if the measured concentration of the set of particles on the sample carrier is low, e.g. close to a resolution limit of the measurement, the particle concentration relation may be changed. Thus, even though the concentration of particles in the flow of air may be unchanged the concentration of the set of particles on the sample carrier may be increased by changing the particle concentration relation. Changing the particle concentration relation dynamically may e.g. be done by changing a duration of collection of particles in the particle capturing arrangement.

The device may be configured to increase the number of particles collected per single measurement relative to the concentration of particles in ambient air. By the present arrangement a significant up-concentration of particles may be provided.

An advantage is that at and above a certain level of up-concentration the measurement time may be further reduced. A reduction of measurement time may consequently allow for an increased measurement frequency.

According to an embodiment, the cleaner may be configured to change the sign of the first electrical charge of the sample carrier such that particles previously attracted by the sample carrier are instead repelled.

Given as a non-limiting example, by changing settings on a control of the circuit connected to the conductive film on the sample carrier, the applied electrical charge may be changed between negative and positive.

An advantage is that a cleaner configured to change the sign of the first electrical charge of the sample carrier may provide an effective method for cleaning the sample carrier after a completed measurement in order to prepare it for a subsequent measurement. Another advantage is that changing signs may be easily controllable and therefore automated, such that it may provide an automated cleaning solution reducing the need for human involvement.

According to an embodiment, the cleaner may comprise any one in a group of: a blowing device configured to provide a flow of air such that the particles on the surface are blown off of the surface, a vibration device configured to generate ultrasonic vibrations to the sample carrier such that the particles on the surface are shaken off of the surface, a sweeping device configured to mechanically sweep the surface of the sample carrier such that the particles on the surface are swept off of the surface, and a rotation device configured to turn the sample carrier such that the particles on the surface are pulled off of the surface by a gravitational force.

According to an embodiment, the device may further comprise a processor configured to perform digital holographic reconstruction on the interference pattern detected by the image sensor to generate an image of the set of particles.

The processor may be arranged internally in the device. Alternatively, the processor may be arranged in an external unit, such that the digital holographic reconstruction may take place elsewhere. Data of the interference patterns detected by the image sensor may be transferred to the processor, either by a wired connection or wirelessly.

It should be understood that when referring to an "image" in the present disclosure, not merely a two-dimensional projection of a three-dimensional object is intended. Rather, it should be seen from a wider point of view in which a holographic reconstruction, being a three-dimensional representation of an object, in this case particles, is also regarded as an image. Further, within the field of digital image processing it is understood by a person skilled in the art that an "image" undergoing processing in e.g. a computer, is not necessarily the visually available representation of the image displayed on screen, but rather it may be the digital representation of the image inside the processor that is being processed. In fact, there is no requirement of providing any display of the image on screen for the processor to be able to carry out the processing of the image. On the contrary, when a processor performs processing of a large amount of images, it is likely to do so without displaying the images on screen. Hence in the present disclosure, included in the term "image" is not only two-dimensional and three-dimensional visually available images, but also digital representations of images inside the processor or a computer memory.

According to an embodiment, the device may be further configured to compare the image of the set of particles to one or more characteristics of particles to identify particles in the image.

Thus, the device may be configured to automatically identify particles in the image such that the device may also count the particles.

According to an embodiment, the device may be further configured to calculate a concentration of particles in the received flow of air based on a counted number of identified particles in the image of the set of particles and the defined particle concentration relation.

By calculating a concentration of particles, it is possible e.g. to automatically provide concentration of pollen in air so as to provide frequent results of pollen concentration.

It should be understood that determining particle concentration may be done by processing a single image, or a plurality of images.

Other objectives, features and advantages of the present inventive concept will appear from the following detailed disclosure, from the attached claims as well as from the drawings.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
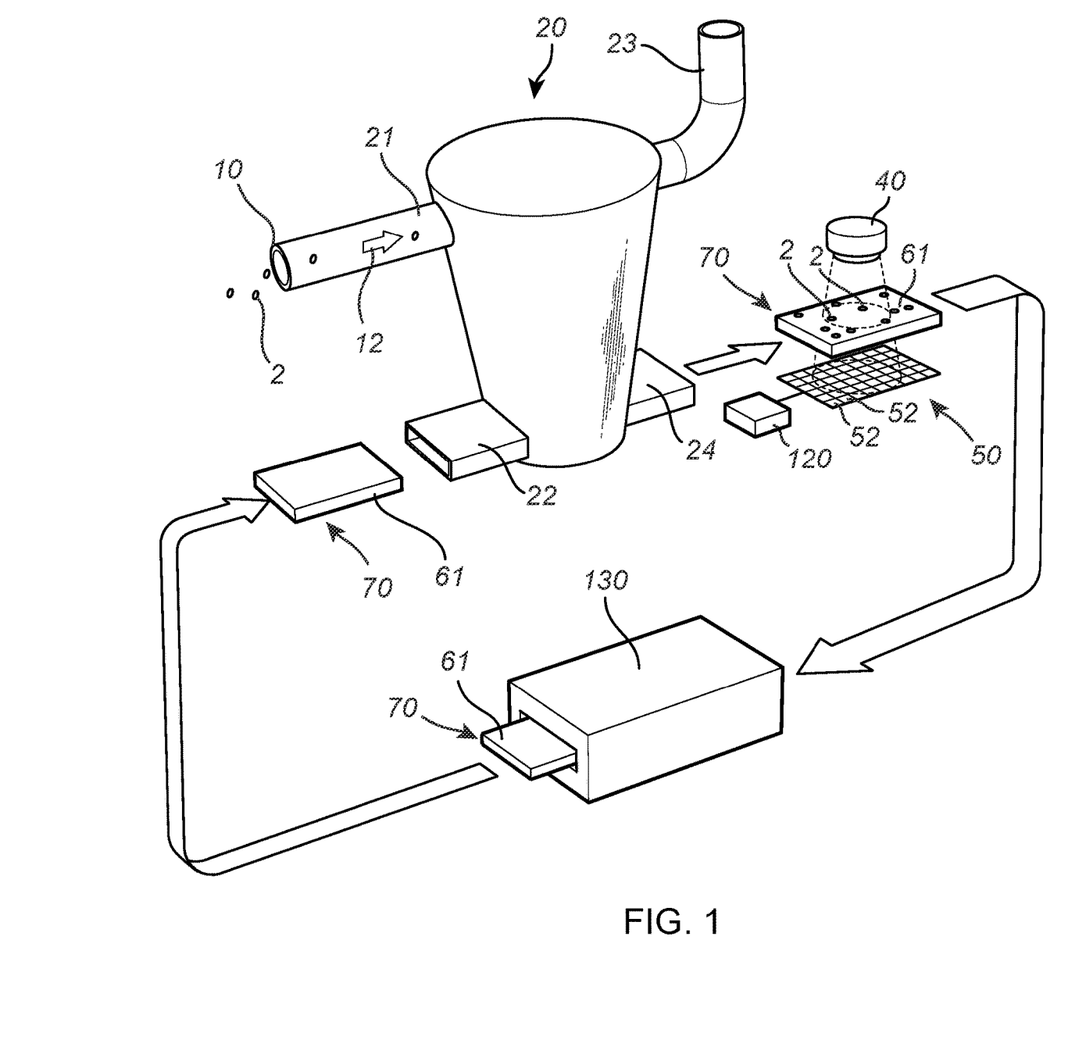
FIG. 1 illustrates a device for detecting particles in air, the device comprising a particle capturing arrangement and a cleaner, according to an embodiment of the inventive concept.
Figure 2:
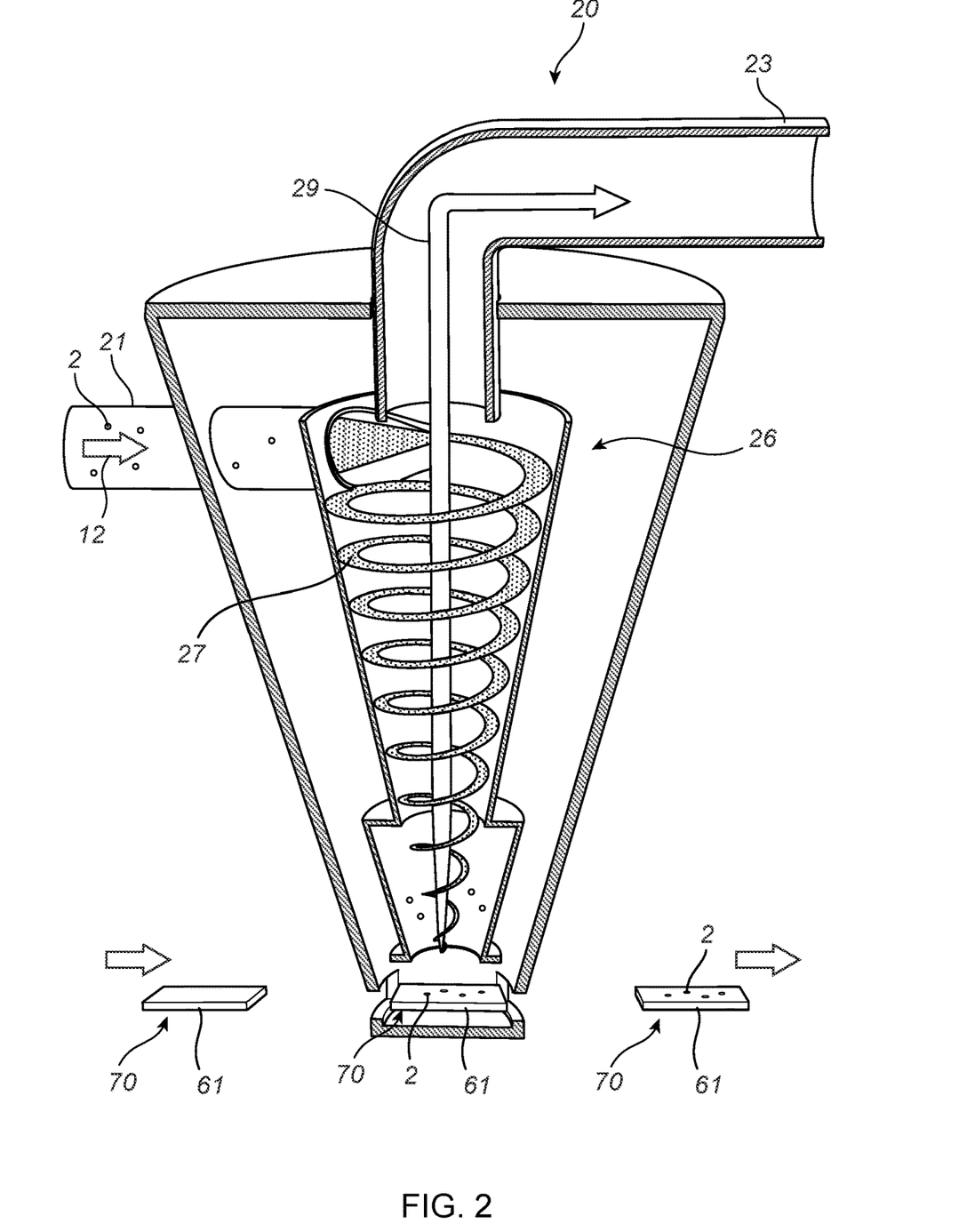
FIG. 2 illustrates a particle capturing arrangement in the form of a cyclone.

FIG. 1 illustrates a device 1 for detecting particles in air, according to an embodiment of the inventive concept. The device 1 comprises a receiver 10 for receiving a flow of air 12, wherein the flow of air 12 comprises particles 2. The flow of air 12 enters a particle capturing arrangement 20 via an air inlet 21. In the illustrated embodiment the particle capturing arrangement 20 further comprises a sample carrier inlet 22, an air outlet 23 and a sample carrier outlet 24. In addition to receiving air, the illustrated particle capturing arrangement 20 receives a sample carrier 70 via the sample carrier inlet 22. The particle capturing arrangement 20 then separates at least part of the particles 2 from the flow of air 12 and transfers them to the sample carrier 70. The sample carrier 70, with the transferred particles 2, subsequently leaves the particle capturing arrangement 20 via the sample carrier outlet 24. The set of particles 2 may be all the particles 2 from the flow of air 12 or a subset of the particles 2 from the flow of air 12. The air may leave the particle capturing arrangement 20 via the air outlet 23. The air from the air outlet 23 may comprise particles 2 that were not transferred to the sample carrier 70. The light source 40 is configured to illuminate the set of particles 2 collected on the sample carrier 70. As the particles 2 are illuminated an interference pattern is formed on an image sensor 50, wherein the interference pattern is formed by interference between light being scattered by the set of particles 2 and non-scattered light from the light source 40. The image sensor 50 comprises a plurality of photo-sensitive elements 52 configured to detect incident light. The image sensor 50 may herein be a charge-coupled device (CCD) or complementary metal-oxide-semiconductor (CMOS) camera. Moreover, the image sensor 50 is connected to a processor 120 configured to perform digital holographic reconstruction on the acquired image data.

Subsequent to completion of an image acquisition, the sample carrier 70 is transferred to a cleaner 130, configured to clean the surfaces of the sample carrier 70 from collected particles 2 and other unwanted accumulated matter. In the illustrated embodiment the cleaner 130 is a complete unit through which the sample carrier 70 is moved, and which comprises a sweeping device, such as stationary brushes that are arranged such that as the sample carrier 70 is moved through the cleaner 130, the particles 2 and other unwanted accumulated matter are mechanically swept off of the surfaces of the sample carrier 70. Alternatively, it may comprise moving brushes that perform an active sweeping motion to clean the sample carrier 70.

It should be understood that the cleaner may comprise alternative means for cleaning the surfaces of the sample carrier 70.

In alternative embodiments, the cleaner 130 may comprise a blowing device configured to provide a flow of air such that the particles on the surface are blown off of the surface. Such embodiments may be realized by the use of one or more fans, or by connecting the cleaner to a grid with pressurized air.

In other alternative embodiments, the cleaner 130 may comprise a vibration device configured to generate ultrasonic vibrations to the sample carrier such that the particles on the surface are shaken off of the surface. In alternative embodiments, the cleaner 130 may comprise a rotation device configured to turn the sample carrier such that the particles on the surface are pulled off of the surface by a gravitational force.

Although illustrated here as a complete enclosed unit, the cleaner 130 may alternatively be merely a set of cleaning means, e.g. brushes, installed openly with the other parts of the device, without being arranged inside an individual housing.

Subsequent to being cleaned by the cleaner 130, the sample carrier 70 is returned to the sample carrier inlet 22 of the particle capturing arrangement 20, such that the sample carrier 70 can be re-used for a subsequent particle collection event.

The device 1 may comprise a sample carrier 70, which may comprise a single, unitary substrate that may extend through the sample carrier inlet 22, the sample carrier outlet 24, an image acquisition position, and the cleaner 130. Particle collection may be performed on a portion of the substrate before the portion is transferred to the image acquisition position, thereby presenting a new portion of the substrate in the particle capturing arrangement for making a subsequent collection of particles.

However, the device 1 may alternatively, as indicated in FIG. 1, comprise a plurality of substrates 61, which are moved between different positions for particle collection, image acquisition and cleaning.

FIG. 2 illustrates a particle capturing arrangement 20 in the form of a cyclone. The illustrated cyclone receives a flow of air 12 comprising particles 2 via the air inlet 21. The air is subsequently led to a spinner 26 in the form of a chamber with a conical shape. The air then enters the chamber along a tangent of the inner side wall. By following the side walls of the conically shaped chamber the flow of air 12 forms a rotating flow of air 27 which in the illustrated cyclone follows the helical path of a descending vortex towards the narrow end of the chamber. Part of the particles 2 are spun out towards the side walls of the chamber through centrifugal action and fall onto a surface of the sample carrier 70. In the illustrated cyclone the flow of air 12 subsequently continues as an exit flow 29 from the narrow end of the chamber towards the air outlet 23. The flow of air 12 now comprises less or no particles 2. When the particle collection event is completed, the sample carrier 70 along with the collected particles 2, may continue to be transferred out from the particle capturing arrangement 20.

In the illustrated cyclone a particle concentration relation between the concentration of particles in the flow of air 12 entering the inlet 21 and the number of particles collected onto the sample carrier 70, may be set by for example the efficiency of the particle transfer and/or the volumetric flow rate of the air 12.

Figure 3:
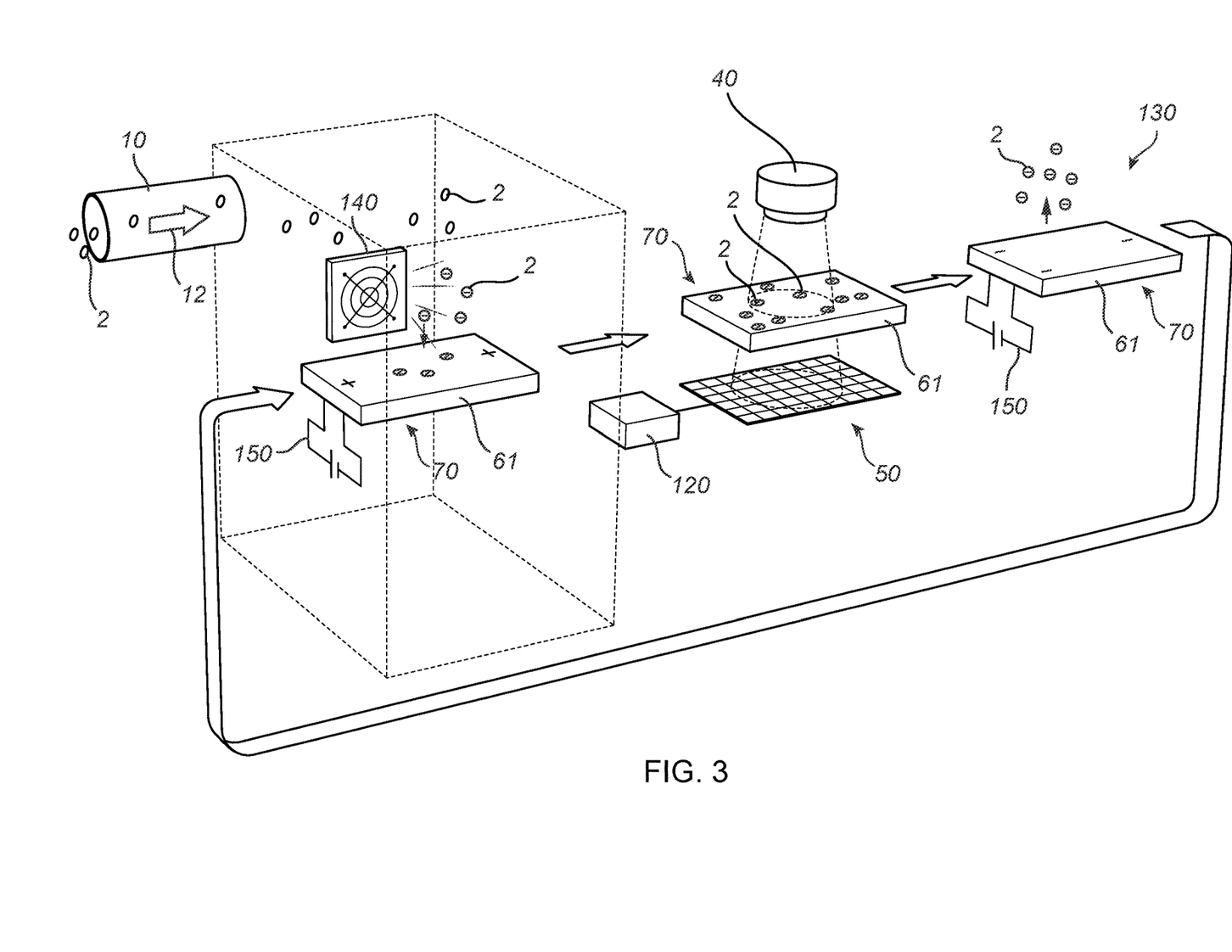
FIG. 3 illustrates a device for detecting particles in air, the device comprising particle collection and cleaning based on electrostatics, according to an embodiment of the inventive concept.

FIG. 3 illustrates a device 1 for detecting particles in air, the device comprising particle collection and cleaning based on electrostatics, according to an embodiment of the inventive concept. The device 1 comprises a receiver 10 for receiving a flow of air 12 with particles 2. The flow of air 12 enters a particle capturing arrangement 20 further comprising an ionizer 140 configured to provide the particles 2 with a negative electrical charge. The particle capturing arrangement 20 further receives a sample carrier 70 which is connected to an electric circuit 150. The electric circuit is configured to provide a surface of the sample carrier 70 on which particles are to be collected with a positive electric charge. The negatively charged particles 2 in the flow of air 12 are consequently attracted to the positively charged surface of the sample carrier 70, and are thus pulled towards the sample carrier 70. In this manner, the particle capturing arrangement 20 separates at least part of the particles 2 from the flow of air 12 and collects them on the sample carrier 70. The sample carrier 70, with the collected particles 2, subsequently leaves the particle capturing arrangement and is positioned between the light source 40 and the image sensor 50. As the particles 2 are illuminated by the light source 40, the resulting interference pattern is acquired by the image sensor 50.

Subsequent to completion of the image acquisition, the sample carrier 70 is transferred to a cleaner 130, configured to clean the surfaces of the sample carrier 70 from collected particles 2. In the illustrated embodiment the cleaner 130 comprises an electric circuit 150 configured to provide the sample carrier 70 with a negative electric charge. The negatively charged particles 2 that were previously attracted to the positively charged sample carrier 70 are now repelled by the negatively charged sample carrier 70, and are thus pushed away from the sample carrier 70. In this manner, the sample carrier 70 is cleaned from the particles 2.

It should be understood that the electric circuit 150 may be either an integrated part of the sample carrier 70, or the electric circuit 150 may be a stand-alone unit that follows the sample carrier 70 when circulating in the device 1. The electric circuit 150 in the cleaner 130 is thus the same electric circuit 150 as in the particle capturing arrangement 20. The circuit may therefore be configured to provide the sample carrier 70 with negative charge in a first mode and positive charge in a second mode, and configured to switch between the first and the second modes, depending on whether particle collection or cleaning is called upon. Alternatively, the electric circuit 150 in the cleaner 130 may be a different electric circuit 150 from the electric circuit in the particle capturing arrangement 20.

Figure 4:
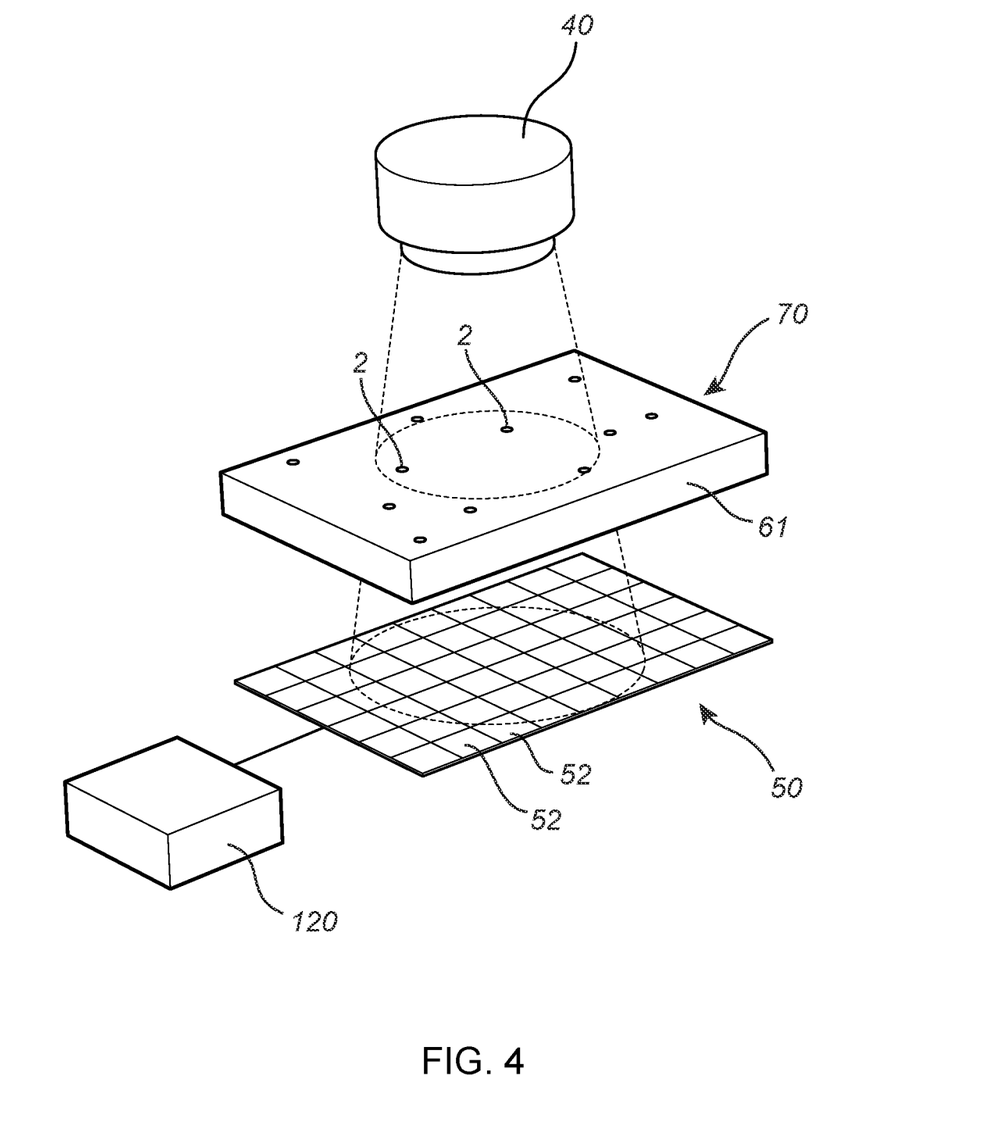
FIG. 4 illustrates further details of the imaging components of the device, such as a sample carrier, a light source, an image sensor, and a processor, according to an embodiment of the inventive concept.

FIG. 4 illustrates further details of the imaging components of the device 1, such as the sample carrier 70, the light source 40, the image sensor 50, and a processor 120, according to an embodiment of the inventive concept. The sample carrier 70 is configured to provide a light path from the light source 40 to the image sensor 50 through sample carrier 70. This may be accomplished e.g. using a transparent sample carrier 70. In the illustrated embodiment, the non-scattered light from the light source 40, i.e. the reference light, is passed along a common optical path with the light being scattered by the particles 2, i.e. the object light. Thus, the interference pattern is formed within a wavefront passing the particles 2 and the sample carrier 70 in a so-called in-line holography set-up.

In FIG. 4 the image sensor 50 is connected to a processor 120 configured to perform digital holographic reconstruction on the interference pattern detected by the image sensor 50 to generate an image of the set of particles 2. Any suitable algorithm for performing the digital holographic reconstruction may be used, as known to the person skilled in the art, including a Gerchberg-Saxton algorithm or multi-acquisition (multi-depth and/or multi-wavelength) for phase retrieval, or reconstruction based on angular spectrum diffraction by means of Gabor wavelet transform. The processor 120, or another processor, may then identify particles 2 in the image and subsequently count the identified particles 2.

The processor 120 may be implemented as a processing unit, such as a central processing unit (CPU), which may execute the instructions of one or more computer programs in order to implement functionality of the processor 120.

The processor 120 may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement functionality of the processor 120.

A surface concentration of particles 2 in the sample carrier 70 may be calculated from the counted number of particles 2 in the image and the surface area of the sample carrier 70 that the illumination from the illumination source 40 and the image sensor 50 jointly cover. However, a surface concentration of particles may be calculated from the counted number of particles 2 in a plurality of images to achieve a statistically accurate result. The surface concentration of particles 2 may subsequently be used to determine a concentration of particles 2 in the flow of air 12, corresponding to the concentration in the air at the receiver 10 of the device 1. The concentration of particles 2 in the flow of air 12 may be calculated based on the surface concentration of particles 2 based on one or more of the sample carriers 70 and the particle concentration relation.

As the SNR of the detected interference pattern may decrease with increasing distance between the image sensor and the scattering particle 2, it may be advantageous if the distance between the set pf particles 2 collected on the sample carrier 70 and the image sensor 50 is below a distance threshold. It should therefore be understood that it may be advantageous with a sample carrier 70 close to the image sensor 50, e.g. in immediate proximity of the image sensor. It should be understood that in this respect FIG. 1, FIG. 3 and FIG. 4 should be interpreted as schematic illustrations, wherein the sample carrier 70 is illustrated some distance away from the image sensor 50 for the sake of clarity.

The embodiments of the inventive concept presented above may be applied for a number of different purposes aiming at monitoring particles in interior and exterior air. The particles may be any type of air-borne particulate matter such as pollen, dust, soot, air-borne bacteria, or fungi. There is provided a device for detecting particles in air and determining if the collected particles are particles of interest. The concept allows a high measurement frequency and has a potential of performing automated measurements.

Further, it may be capable of classifying or determining the type of particle collected.

Outdoor applications may be monitoring of exterior air quality for detection of pollen, dust, soot, or other pollutants.

According to an embodiment, a device for detecting pollen in air is provided. Thanks to the present inventive concept, pollen levels in exterior air may be monitored with a high frequency, and with the potential of performing automated measurements. It may also provide measurement stations at a low cost, which may lead to an increased number of measurement stations. This in turn may have the potential of providing more up-to-date and geographically more precise information on pollen levels in exterior air, which may be valuable to people that are affected by pollen allergies.

Indoor applications may be monitoring interior air quality for detection of molds, fungi, pollen, dust, or bacteria. Such monitoring can be applied in a variety of locations, such as public shopping malls, hospitals or laboratories.

Monitoring of air-borne bacteria may be of particular importance in aseptic environments, such as the manufacturing environment for pharmaceutical production. Monitoring of air-borne bacteria in interior air may be required to ensure a sterile manufacturing environment.

Presence of bacteria in the manufacturing environment of pharmaceutical products may contaminate the products and force the products manufactured in a contaminated environment to be disposed. Thus, early detection of presence of bacteria may be highly advantageous, because if production in a contaminated environment is continued, a large quantity of products may have to go to waste.

According to an embodiment, a device for detecting bacteria in air is provided. Thanks to the present inventive concept, bacterial levels in interior air may be monitored with a high frequency, and with the potential of providing results in real-time. As soon as bacterial levels are detected, the production may be stopped such that no or very little of the pharmaceutical products will go to waste.

Moreover, the real-time aspect of the present inventive concept further allows for monitoring of development of bacterial levels over time, by acquiring time sequences of measurements. In this manner bacterial growth may be studied.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device for detecting particles in air; said device comprising:
a receiver for receiving a flow of air comprising particles;
a sample carrier;
a particle capturing arrangement configured to exert a force on the particles in the flow of air such that the particles are separated from the flow of air for collection of a set of particles on a surface of the sample carrier;
a light source configured to illuminate the particles collected on the surface of the sample carrier, such that an interference pattern is formed by interference between light being scattered by the particles and non-scattered light from the light source;
an image sensor comprising a plurality of photo-sensitive elements configured to detect incident light, the image sensor being configured to detect the interference pattern formed by interference between light being scattered by the particles on the surface of the sample carrier and non-scattered light from the light source; and
a cleaner configured for cleaning the surface of the sample carrier for enabling re-use of the surface for collection of a subsequent set of particles.

2. The device according to claim 1, wherein the force exerted on the particles is an electrostatic force.

3. The device according to claim 1, wherein the particle capturing arrangement is configured to provide the sample carrier with a first electrical charge.

4. The device according to claim 3, wherein the particle capturing arrangement comprises an ionizer system configured to provide the particles in the flow of air with a second electrical charge, wherein the first and second electrical charge have opposite signs such that the particles are electrostatically attracted to the surface of the sample carrier.

5. The device according to claim 3, wherein the cleaner is configured to change the sign of the first electrical charge of the sample carrier such that particles previously attracted by the sample carrier are instead repelled.

6. The device according to claim 1, wherein the particle capturing arrangement is configured such that, in the particle capturing arrangement, the particles are transferred from the flow of air by a gravitational force.

7. The device according to claim 6, wherein the particle capturing arrangement comprises a cyclone configured to separate the particles from the flow of air, wherein the particle capturing arrangement is further configured to allow the separated particles to be transferred such that particles land on the surface of the sample carrier.

8. The device according to claim 1, wherein the light source is configured to emit at least partially coherent light.

9. The device according to claim 1, wherein:
the light source is arranged at a first side of the sample carrier; and
the image sensor is arranged at a second side of the sample carrier, wherein the second side of the sample carrier is opposite to the first side of the sample carrier;
wherein the light source, the sample carrier and the image sensor are further arranged to provide a light path from the light source to the image sensor through the sample carrier and through the surface of the sample carrier with the collected set of particles.

10. The device according to claim 1, wherein the device is further configured to define a particle concentration relation, defining a relation between the set of particles on the sample carrier and a concentration of particles in the flow of air.

11. The device according to claim 10, further comprising a processor configured to perform digital holographic reconstruction on the interference pattern detected by the image sensor to generate an image of the set of particles, the device being further configured to:
compare the image of the set of particles to one or more characteristics of particles to identify particles in the image,
wherein the device is further configured to calculate a concentration of particles in the received flow of air based on a counted number of identified particles in the image of the set of particles and the defined particle concentration relation.

12. The device according to claim 1, wherein the cleaner comprises any one in a group of: a blowing device configured to provide a flow of air such that the particles on the surface are blown off of the surface, a vibration device configured to generate ultrasonic vibrations to the sample carrier such that the particles on the surface are shaken off of the surface, a sweeping device configured to mechanically sweep the surface of the sample carrier such that the particles on the surface are swept off of the surface, and a rotation device configured to turn the sample carrier such that the particles on the surface are pulled off of the surface by a gravitational force.

13. The device according to claim 1, further comprising a processor configured to perform digital holographic reconstruction on the interference pattern detected by the image sensor to generate an image of the set of particles.

14. The device according to claim 13, the device being further configured to:
   compare the image of the set of particles to one or more characteristics of particles to identify particles in the image.

* * * * *